US007395838B2

(12) United States Patent

Weber et al.

(10) Patent No.: US 7,395,838 B2

(45) Date of Patent: Jul. 8, 2008

(54) PISTON-TYPE ACCUMULATOR

(75) Inventors: Norbert Weber, Sulzbach (DE); Herbert Baltes, Losheim (DE)

(73) Assignee: Hydac Technology GmbH., Sulzbach/Saar (DE)

( * ) Notice: Subject to any disclaimer, the term of this patent is extended or adjusted under 35 U.S.C. 154(b) by 195 days.

(21) Appl. No.: 10/544,110

(22) PCT Filed: Jan. 22, 2004

(86) PCT No.: PCT/EP2004/000472

§ 371 (c)(1), (2), (4) Date: Aug. 2, 2005

(87) PCT Pub. No.: WO2004/085853

PCT Pub. Date: Oct. 7, 2004

(65) Prior Publication Data

US 2006/0204389 A1 Sep. 14, 2006

(30) Foreign Application Priority Data

Mar. 25, 2003 (DE) ................................ 103 13 241

(51) Int. Cl.
*F16L 55/04* (2006.01)

(52) U.S. Cl. .......................................... 138/31; 138/30

(58) Field of Classification Search .................. 138/31, 138/30

See application file for complete search history.

(56) References Cited

U.S. PATENT DOCUMENTS 2,734,531 A * 2/1956 Bizak .......................... 138/31
2,828,760 A * 4/1958 Taylor et al. ........... 137/115.26
2,884,955 A * 5/1959 Yost ............................ 138/31
3,015,345 A * 1/1962 Michael ........................ 138/31
3,043,340 A * 7/1962 Rehbock ....................... 138/31
3,064,686 A * 11/1962 Gratzmuller ................. 138/31
3,174,505 A * 3/1965 Bauer ..................... 137/505.18
3,474,830 A * 10/1969 Hertell ........................ 138/30
4,041,990 A 8/1977 Tang et al.
6,267,147 B1 7/2001 Rago
6,923,215 B2 * 8/2005 Weber ......................... 138/31

FOREIGN PATENT DOCUMENTS

| | | | |
|---|---|---|---|
| DE | 739 831 | C | 10/1943 |
| DE | 101 39 192 | A1 | 3/2003 |
| EP | 1 308 634 | A1 | 5/2003 |
| FR | 985 370 | A | 7/1951 |
| WO | WO 02/12731 | A1 | 2/2002 |

* cited by examiner

*Primary Examiner*—James F Hook
(74) *Attorney, Agent, or Firm*—Roylance, Abrams, Berdo & Goodman, L.L.P.

(57) ABSTRACT

A piston-type accumulator includes an accumulator housing provided in the form of a cylinder tube (1). A separating piston (15) separates two working spaces (5) and (6) from one another in the housing and can be displaced in an axial direction within a piston stroke area (19) of the cylinder tube (1). The cylindrical tube is closed at one axial end by a closure part (7). The closure part is defined by deforming a deforming area (9) of the wall of the cylinder tube (1). The deforming area adjoining the piston stroke area (19) is provided in the form of part that exists as a single piece with the housing. A stop body (25), which limits the movement of the separating piston (15) before reaching the deforming area (9), is provided inside the cylinder tube (1) at the location where the piston stroke area (19) transitions into the deforming area (9).

10 Claims, 2 Drawing Sheets

PISTON-TYPE ACCUMULATOR

FIELD OF THE INVENTION

The present invention relates to a piston-type accumulator having an accumulator housing in the form of a cylindrical tube. A separating piston separates two working chambers from each other in the housing, and may be moved in the axial direction within a piston stroke area of the cylindrical tube. The cylindrical tube is closed off at both axial ends by closing components. At least one closing component is configured by shaping of a reshaping area of the wall of the cylindrical tube adjoining the piston stroke area as an integral part of such wall.

BACKGROUND OF THE INVENTION

Piston-type accumulators, in the broadest sense of the term, are a category of hydraulic accumulators which perform the function of receiving specific volumes of a pressurized liquid (hydraulic medium) from a hydraulic system and returning these volumes to the system as required. Since the hydraulic medium is under pressure, hydraulic accumulators are treated as pressurized containers and must be designed for the maximum excess operating pressure. Allowance must be made for the acceptance standards of diverse countries in which the containers are installed. In most hydraulic systems, use is currently made of hydropneumatic (gas-impinged) accumulators with separating elements. A piston separates a fluid space as a working chamber from a gas supply space as another working chamber, thereby serving as the separating element inside the accumulator housing of the piston-type accumulator. As a rule, nitrogen is used as the operating gas. The gas-tight piston to a great extent permits decoupling of gas supply space from liquid space.

The fluid component is connected to the hydraulic circuit, so that the piston-type accumulator receives fluid when the pressure rises and the gas is compressed in the process. The compressed gas expands as the pressure drops, and forces the stored pressurized fluid back into the hydraulic circuit. It is an advantage of piston-type accumulators that they can "work" in any position, but preference is to be given to a vertical arrangement with the gas side on top so that settling of fouling particles from the fluid onto the piston seals is prevented.

The essential components of a piston-type accumulator thus are an outer cylindrical tube forming an accumulator housing, a piston with a sealing system as a separating element, and closing components on the front side which are both cover elements and at the same time also include a fluid connection and a gas connection. The accumulator is as a rule assigned two functions, that of supplying the interior pressure and that of ensuring control of the piston inside the accumulator housing.

In an effort to make production of hydraulic accumulators more efficient and cost-effective, a transition has already been made to not providing a separate cover part as the closing component fastened at least on the front end side of the cylindrical tube. Rather, the closing component is configured as an integral part with the front end of the cylindrical tube. The wall of this tube is shaped in a reshaping area. WO 98/55258 discloses an appropriate example of the production of a hydraulic accumulator in the form of a diaphragm accumulator. Shaping of the closing component is effected by conventional means as a function of the type of material of the cylindrical tube by cold or hot working, for example, after flame or induction heating has been completed, by rolling or compressing. The end of the cylindrical tube is reshaped to a bottom with a collar turned outward on which a connection for the appropriate operating medium is formed. While the expenditure of production effort required for production of a diaphragm accumulator is simplified, problems arise if such processes are to be carried out for production of piston-type accumulators.

SUMMARY OF THE INVENTION

An object of the present invention is to provide a piston-type accumulator having a construction affording simple and efficient production of the accumulator housing by shaping of the cylindrical tube on the end without generating problems during operation with respect to the behavior of a piston-type accumulator manufactured in this manner.

This object is attained in the case of a piston-type accumulator where there is provided in the interior of the cylindrical tube, at the point of transition from the piston stroke area to the reshaping area, a stop element restricting the movement of the separating piston before reaching the reshaping area.

As a result of the restriction or blocking of the piston movement, the piston in its end position is still outside the reshaping area. Thus, the risk of interruption of operation is effectively prevented. If there were no piston end position specified for piston-type accumulators with a reshaping area provided on the end of the cylindrical tube, the separating piston could enter the reshaping area in certain operating situations, such as loss of gas in the gas supply space or high fluid pressures for example. The danger would then exist of canting or seizing of the piston because of the possible change in the geometry of the piston due to shaping of the wall of the cylindrical tube and roughened areas in the interior of the end of the housing due to the reshaping. The stop element mounted inside the cylindrical tube in such a position according to the present invention, in which the end position of the reshaping area is secured at the end of the piston thrust area and accordingly before entry into the reshaping area, makes certain that the trouble-free and gas-tight control of the piston afforded by the interior wall of the cylindrical tube in the piston stroke area will be maintained under all piston operating conditions.

Preferably, the stop element is positively fitted so as to be secured from axial movement by retaining surfaces positioned on the inside of the wall of the cylindrical tube. Definite limitation of the stroke of the piston is then ensured even in the event of hard contact with the stop element.

A first retaining surface positioned at the end of the piston stroke area may be configured as a shoulder, forming a recess in the inner wall of the cylindrical tube. The stop element may be introduced into the cylindrical tube from the adjacent open end and positioned on the shoulder before shaping during production of the piston-type accumulator. The stop element is now mounted in a specific position for the shaping step forming the closing component of the cylindrical tube. A second retaining surface positively locking the stop element, a surface positioned inside the reshaping area, may now be configured by shaping the wall of the cylindrical tube forming the closing component. The wall of the cylindrical tube is shaped during shaping around the wall area of the stop element situated in the reshaping area.

This "molding" of the stop element is found to be especially advantageous if the stop element is in the form of a level plate having on its circumference a crowned, convex camber around which the wall of the cylindrical tube is shaped during formation of the closing component in order to configure the second retaining surface situated in the reshaping area.

When use is made of a stop element in the form of a plate, that is, a rigid structural element situated in the cylindrical tube at the point of transition to the reshaping area, the additional advantage is gained that the stop element functions as a support element in the process of shaping. The piston stroke area situated in advance of the circumferential area is then supported during configuration of the closing component, and accordingly is protected from any alteration of its geometry potentially caused by the shaping process.

The plate-shaped stop element may be replaced by an annular element round in cross-section, such as a steel ring which is forced into a seat forming the positive-locking retaining surface. This seat is installed in the inner wall of the cylindrical tube.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
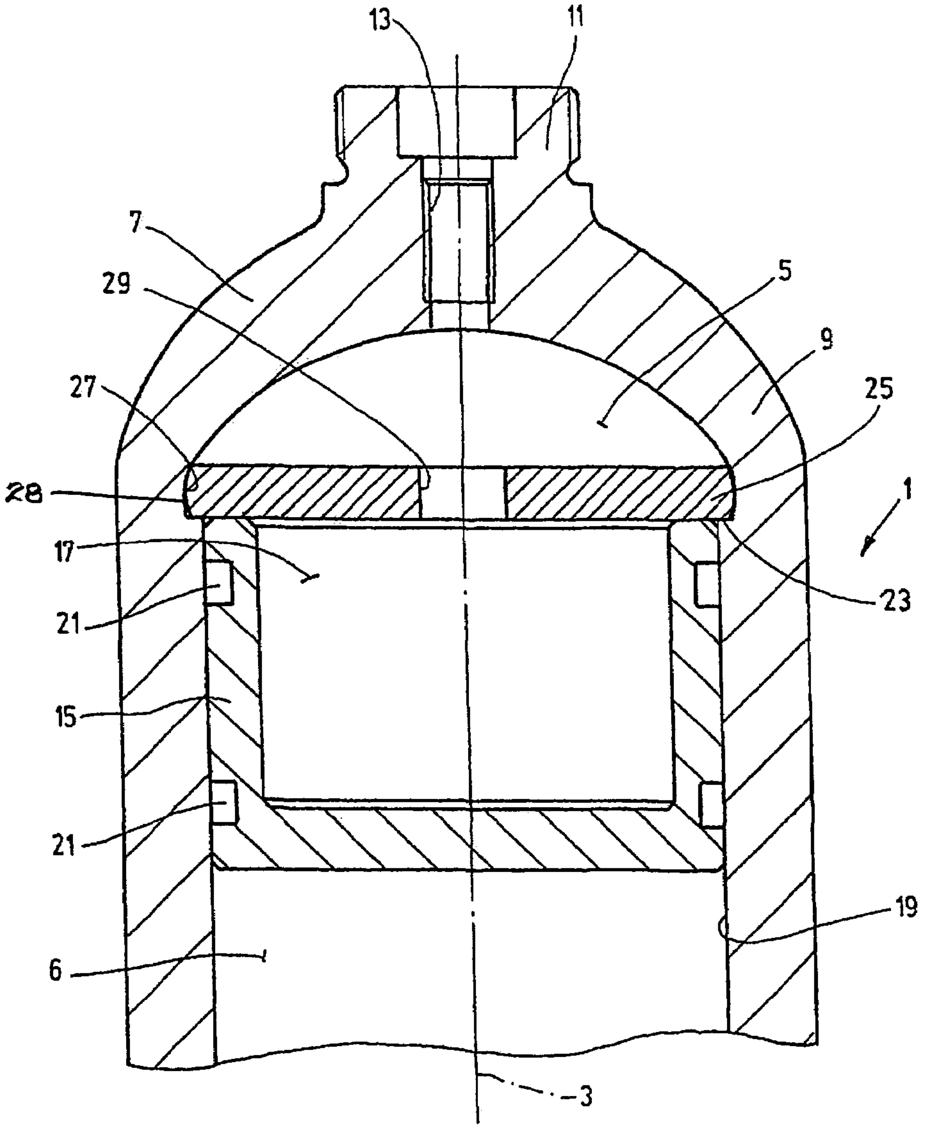
FIG. 1 is a partial, simplified, diagrammatic side elevational view in section of a piston accumulator according to a first embodiment of the present invention, with only the end area of the accumulator housing on the gas side being shown, and the piston sealing and control means being omitted.

In the case of the piston-type accumulators according to the present invention and shown in the drawings, the accumulator housing has a round cylindrical tube 1 which defines a longitudinal axis 3. In its end area, the cylindrical tube 1 has on its gas side a closing component 7 delimiting a gas supply space 5. Closing component 7 is formed as an integral part or unitary, one-piece of the cylindrical tube 1, and is formed by shaping the wall of the cylindrical tube 1 in a reshaping area 9. As has already been stated, the shaping process forming the closing component 7 is carried out in accordance with a reshaping process disclosed in the prior art. A cold or hot working process is executed by rolling or chasing tools or the like, as a function of the properties of the metal material making up the cylindrical tube 1. The closing component 7 is configured as a closed bottom on which a neck component 11 is formed projecting coaxially to the axis 3. The neck component has a gas channel 13 leading to the gas supply space 5 and a connection for appropriate connection fittings (not shown).

A separating piston 15 forms the separating element between gas supply space 5 and a fluid space 6, has a trough-like recess 17 concentric with the longitudinal axis for increasing the volume of the gas supply space 5, and is controlled inside a piston stroke area 19 of the cylindrical tube 1 so as to be longitudinally displaceable. The inside of the wall of the cylindrical tube is microfinished in the piston stroke area 19 to ensure gas-tight and low-friction piston control inside the piston stroke area 19 in conjunction with piston closing and piston control means provided on the circumference of the piston 15. The sealing and control means provided on the circumference of the piston 15 are not shown in the drawing. These means, seated in circumferential annular grooves 21 of the piston 15, may be of conventional design.

At the end of the piston stroke area 19, the inner wall of the cylindrical tube 1 has a shoulder 23 forming a recess in the inner wall. This shoulder makes available a level stop surface for a level plate 25. For the fixing of the plate in position, the level stop surface forms a retaining surface which locks the plate 25 positively against axial movement in the direction of the piston stroke area 19. The plate 25 has a convex, crowned circumferential surface 27. During shaping of the wall of the cylindrical tube 1, in which the reshaping area 9 adjoining the piston stroke area 19 is formed, the wall of the cylindrical tube 1 is shaped around the crowned circumferential surface 27 of the plate 25 to form a concave cambered surface 28 in the cylindrical tube adjacent shoulder 23. The shaped cylinder wall with its concave cambered surface 28 then forms a second retaining surface on the crowned circumferential surface 27 for fixing the plate 25 in position so that the plate is secured positively against axial movement in both directions.

In the process of production of the hydraulic accumulator, the plate 25 is introduced from the initially open end of the cylindrical tube and positioned against the shoulder 23 so that it accordingly is suitably positioned for the shaping step. As additional fixing in position, in advance of execution of the shaping step forming the reshaping area 9, the recess 23 forming the shoulder 23 in the inner wall of the cylindrical tube 1 may be configured so that the bottom of the recess forms in conjunction with the crowned circumferential surface 27 of the plate 25 a press fit which holds the plate 25 in position during shaping of the circumferential area 9.

An opening 29 configured centrally in the plate is provided as gas discharge opening. The plate 25, designed as a relatively rigid structural element of a steel material, for example, forms not only a stop element for the piston 15 which blocks movement of this piston before leaving the piston stroke area 19, but additionally forms a rigid support element for the cylindrical tube 1 in the area of transition from the piston stroke area 19 to the reshaping area 9 during the shaping process. The shaping forces acting on the reshaping area 9 then can cause no changes in the geometry of the cylindrical tube 1 in the piston stroke area 19. The piston 15 is accordingly controlled in the microfinished piston stroke area 19 under all operating conditions of the piston-type accumulator. The plate 25 acts as stop element making certain that no introduction of the piston 15 into the reshaping area 9 may occur. The inner wall of the cylindrical tube 1, unlike piston stroke area 19 extending to the shoulder 23, requires no microfinishing on the inside.

Figure 2:
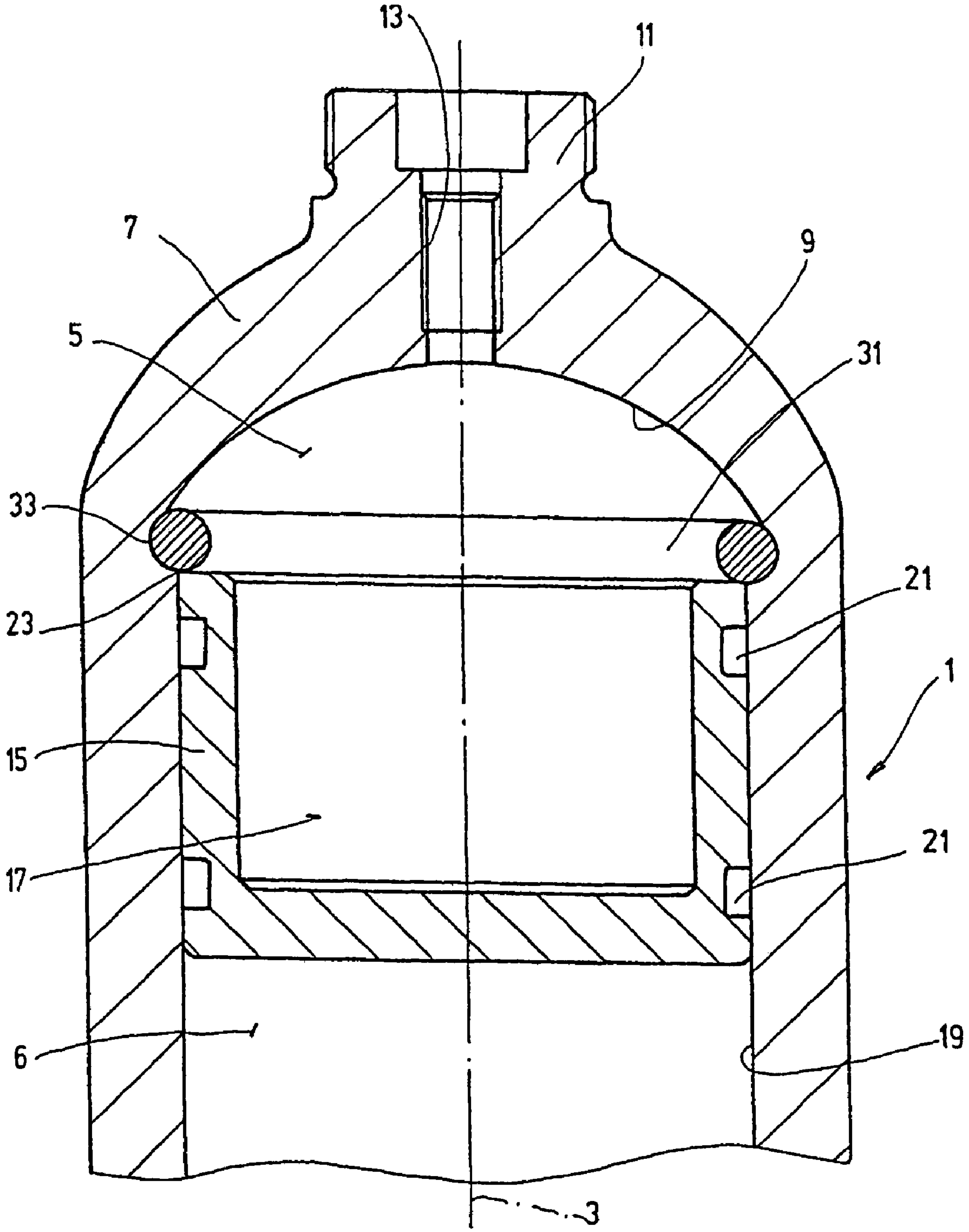
FIG. 2 is a partial, simplified, diagrammatic side elevational view in section, similar to FIG. 1, of a piston accumulator according a second embodiment of the present invention.

The exemplary embodiment shown in FIG. 2 differs from the example shown in FIG. 1 only to the extent that the stop element limiting piston movement at the end of the piston stroke area 19 of the cylindrical tube 1 is a steel ring 31, rather than a plate. In this exemplary embodiment the shoulder 23 on the inside of the cylindrical tube 1 forms at the end of the piston stroke area 19. A cambered partial surface of a cambered inner annular groove 33 forms the seat for the steel ring 31. The cambered surface of this annular groove 33, which extends around an adequate circumferential area of the steel ring 31, forms the retaining surfaces positively locking the ring 31 from axial movement in both directions.

A closed ring 31 may be used if the annular groove 33 is configured exclusively by the shaping which forms the reshaping area 9 in the area axially some distance from the shoulder 23. The steel ring 31 may be introduced from the open end of the cylindrical tube 1 in advance of shaping. As an alternative, that is, if the annular groove is not finished in the shaping process, that is, so to speak "is closed," a slotted steel ring 31 may be forced into an already fully configured annular groove 33.

In the example shown in FIG. 1, a plate 25 with only one opening 29 for gas discharge opening is shown. It is obvious that a plate having several openings, including one in the form of a mesh plate, could be provided.

While various embodiments have been chosen to illustrate the invention, it will be understood by those skilled in the art that various changes and modifications can be made therein without departing from the scope of the invention as defined in the appended claims.

What is claimed is:

1. A piston accumulator, comprising:

an accumulator housing in a form of a cylindrical tube with first and second working chambers and with a piston stroke area, said cylindrical tube having a wall adjoining said piston stroke area and being a unitary one-piece component of said cylindrical tube;

a piston separating said working chambers from one another and being movable in an axial direction within said piston stroke area;

first and second closing components closing axial ends of said cylindrical tube, said first closing component being formed by shaping a reshaping area of said wall of said cylindrical tube;

a rigid stop element of rigid, non-elastic material in an interior of said cylindrical tube at a transition point from said piston stroke area to said reshaping area, said stop element restricting movement of said piston before reaching said reshaping area, said stop element being a level plate having a rigid, crowned, convex cambered circumferential surface;

a shoulder inside said cylindrical tube supporting and retaining said stop element; and a concave cambered surface in said cylindrical tube adjacent said shoulder receiving, formed about and directly engaging said circumferential surface of said stop element during deformation of said wall in forming said first closing component to retain positively said stop element in place in said cylindrical tube against axial movement.

2. A piston accumulator according to claim 1 wherein said level plate has at least one discharge opening allowing fluid flow therethrough.

3. A piston accumulator according to claim 1 wherein said shoulder forms a level surface abutting a level surface of said level plate adjacent said circumferential surface.

4. A piston accumulator according to claim 1 wherein said first working chamber is a gas supply space; and said second working chamber is a hydraulic fluid space.

5. A piston accumulator, comprising:

an accumulator housing in a form of a cylindrical tube with first and second working chambers and with a piston stroke area, said cylindrical tube having a wall adjoining said piston stroke area and being a unitary one-piece component of said cylindrical tube;

a piston separating said working chambers from one another and being movable in an axial direction within said piston stroke area;

first and second closing components closing axial ends of said cylindrical tube, said first closing component being formed by shaping a reshaping area of said wall of said cylindrical tube;

a rigid stop element of rigid, non-elastic material in an interior of said cylindrical tube at a transition point from said piston stroke area to said reshaping area, said stop element restricting movement of said piston before reaching said reshaping area, said stop element being an annular element having a rigd, crowned, convex cambered circumferential surface;

a shoulder inside said cylindrical tube supporting and retaining said stop element; and a concave cambered surface in said cylindrical tube adjacent said shoulder receiving, formed about and directly engaging said circumferential surface of said stop element during deformation of said wall in forming said first closing component to retain positively said stop element in place in said cylindrical tube against axial movement.

6. A piston accumulator according to claim 5 wherein said first working chamber is a gas supply space; and said second working chamber is a hydraulic fluid space.

7. A method of making a piston accumulator, comprising the steps of:

forming an accumulator housing in a form of a cylindrical tube with first and second working chambers, with a piston stroke area and with the cylindrical tube having a wall adjoining the piston stroke area and being a unitary, one-piece component of the cylindrical tube;

mounting a piston in said cylindrical tube in said stroke area to separate the working chambers from one another and to be movable in an axial direction within the stroke area;

reshaping a reshaping area of the wall of the cylindrical tube to form a first closing component closing one axial end of the cylindrical tube;

closing another axial end of the cylindrical tube with a second closing component;

positioning and supporting a rigid stop element of rigid, non-elastic material on a shoulder inside an interior of the cylindrical tube to retain the stop element at a transition point between the piston stroke area and the reshaping area to restrict movement of the piston before reaching the reshaping area, the stop element being annular and having a rigid, crowned, convex cambered circumferential surface; and forming a concave cambered surface in the cylindrical tube adjacent the shoulder about the circumferential surface of the stop element during deformation of the wall in forming the first closing component to receive, to engage directly and to retain positively the stop element in place in the cylindrical tube against axial movement.

8. A method according to claim 7 wherein said stop element is a level plate with a discharge opening.

9. A method according to claim 8 wherein the shoulder is formed as a level surface abutting a level surface of the level plate adjacent the circumferential surface.

10. A method according to claim 7 wherein gas is supplied to said first working chamber; and hydraulic fluid is supplied to said second working chamber.

* * * * *